United States Patent [19]
Duyverman et al.

[11] 3,720,755
[45] March 13, 1973

[54] PROCESS FOR PREPARING A SOLUTION CONTAINING HYDROXYL AMMONIUM PHOSPHATE

[75] Inventors: Coenraad J. Duyverman, Sittard; Martin J. Gorgels, Stein both of Netherlands

[73] Assignee: Stamicarbon N.V., Heerlen, Netherlands

[22] Filed: March 26, 1971

[21] Appl. No.: 128,495

[30] Foreign Application Priority Data

May 24, 1971 Netherlands .......................7004350

[52] U.S. Cl..................................423/307, 423/321
[51] Int. Cl.....C01b 15/16, C01b 25/26, C01b 25/16
[58] Field of Search ...23/107, 165 B, 190 H; 210/36, 210/40, 41; 252/472

[56] References Cited

UNITED STATES PATENTS

| | | | |
|---|---|---|---|
| 2,628,888 | 2/1953 | Benson | 23/190 X |
| 1,562,818 | 11/1925 | Woltes et al. | 23/165 |
| 1,597,984 | 8/1926 | La Bour | 23/165 |
| 3,186,793 | 6/1965 | Gillis et al. | 23/165 |
| 2,478,261 | 9/1949 | Frank | 252/472 X |
| 826,089 | 7/1906 | Day | 252/472 X |

*Primary Examiner*—Oscar R. Ventiz
*Assistant Examiner*—Gregory A. Heller
*Attorney*—Cushman, Darby & Cushman

[57] ABSTRACT

A process for preparing a solution of hydroxylammonium phosphate which includes catalytic reduction of nitrate ions in an aqueous solution containing phosphoric acid using molecular hydrogen.

In order to maintain the activity of the catalyst the phosphoric acid to be fed to the synthesis zone is first freed of heavy metal contaminants by contacting the phosphoric acid for a sufficient time with hydrogen and an absorbent consisting of a metal of the platinum group.

4 Claims, No Drawings

PROCESS FOR PREPARING A SOLUTION CONTAINING HYDROXYL AMMONIUM PHOSPHATE

The present invention relates to the preparation of a solution of hydroxylammonium phosphate by catalytic reduction of nitrate ions in an aqueous solution containing phosphoric acid using molecular hydrogen.

The reduction is effected by means of a noble-metal catalyst, such as palladium, platinum or rhodium, whether or not on a carrier.

The influence of contaminants on the catalytic activity of metal catalysts of the platinum metal group can be favorable, but more likely is very unfavorable. It is advantageous, therefore, to start with as pure as possible starting materials, to which, if necessary, certain amounts of the elements which raise the activity of the catalyst can be added.

Rock phosphate ore from which phosphoric acid is synthesized is composed not only of calcium oxide and phosphorus pentoxide, but also generally contains considerable quantities of contaminants, the most important of which are $Al_2O_3$, $Fe_2O_3$, $SiO_2$, sulphate and fluoride. In addition, the rock phosphate ore may also contain small quantities of one or more of the following elements As, Ba, Be, B, Cd, Cs, Cr, Cu, J, Pb, Mn, Mo, Ni, rare earths, Rb, Se, Ag, Sr, Sn, Ti, U, V, Zn and Zr, usually in the form of oxides or salts. These contaminants appear in the phosphoric acid prepared from the rock phosphate, whether the phosphoric acid is prepared by the electric furnace method or by the wet process using sulfuric acid. These contaminants are present in only small amounts in the order of parts per million (ppm).

The process according to the present invention provides a method of removing traces of contaminants of dissolved elements, especially heavy metals, from solutions wherein the contaminants occur in such small quantities that they cannot be successfully removed by prior art methods such as cathodic precipitation using a mercury surface as cathode.

According to the invention the contaminants are removed from the contaminated solution by suspending a finely divided metal of the platinum group in the solution and, subsequently, bubbling hydrogen through the solution for some time, or by suspending the metal of the platinum group in a solution already saturated with hydrogen. The various heavy metal contaminants which are present in the dissolved state in the contaminated solution precipitate on the finely divided, highly noble metal.

The temperature and pressure at which the process of the present invention is accomplished can be varied between wide limits. The temperature may lie between the point of solidification of the contaminated solution and the temperature at which the solution exhibits a boiling-like phenomena. Elevation of the temperature increases the speed of purification.

The pressure may be subatmospheric, atmospheric as well as superatmospheric. A higher hydrogen pressure has a favorable influence on the rate at which the purification reaction takes place.

Metals of the platinum group which can be used in the process of this invention include platinum, palladium, ruthenium, rhodium, osmium and iridium. The purification reaction will proceed more efficiently if the metal catalyst has a large external surface, such as metal 'black', metallic sponge, or if it is finely divided on a carrier material with a large specific surface. The carrier material must be resistant to the medium to be purified. Several acceptable carriers are, for instance, graphite, active carbon or silica gel ('aerosil').

It is believed that the heavy-metal ions present in the contaminated solution to be treated are reduced under the influence of the platinum metal-hydrogen combination and thus deposit on the platinum metal mass.

In addition to removing heavy-metal ions, the process of this invention removes several from contaminated solutions by adsorbing them on the platinum metal mass. Examples of such contaminants that can be removed by the process of this invention are Pb, Cu, Mo, As, Sb, S, Hg, J, Sn, Tl, Cd, Ga, Ge, In.

The invention will be further described with reference to the following examples in which solutions of phosphoric acid or a solution of phosphates were treated according to the process of the invention. The purified solutions were tested for their suitability in the catalytic reduction of nitric acid with molecular hydrogen in the presence of a palladium-containing catalyst. In the examples, purification was generally effected at room temperature, in a vessel provided with a stirrer, so that the hydrogen bubbled through the solution in a finely divided state. The rate of hydrogen feed was about 5–10 N liters of $H_2$/hour/liter of liquid.

Finely divided palladium supported on carbon was suspended in the solution as the hydrogen was passed through. The time of treatment took one or more hours. The particles of palladium supported on the carbon were then separated from the liquid by means of a filter or centrifuge. Subsequently, the liquid was tested at room temperature, 25°C, for its suitability for use in the catalytic reduction of nitric acid to hydroxylamine with the aid of molecular hydrogen using a palladium on carbon catalyst suspended in the reaction medium.

The hydrogen used in the catalytic reduction of nitric acid to hydroxylamine was fed to the reaction vessel through a flow meter. The reaction mixture consisted of, at the beginning of each example, 100 ml of a solution containing 2.69 moles per liter of $H_3PO_4$, 2.1 moles per liter of NaOH and 2.65 moles per liter of $NaNO_3$, 300 mg of 5 weight % Pd supported on active carbon and 0.26 mg of $GeO_2$ were suspended in the solution. The hydrogen absorption during the reaction was determined as a function of the time. On completion of the test, the quantities of hydroxylamine and ammonia formed were determined. The hydrogen consumption and the ratio of the hydroxylamine/ammonia produced are measures of the suitability of the starting phosphoric acid or the solutions prepared therefrom. The suitability phosphoric acid was qualified as follows:

bad—The phosphoric acids rated bad contained excessive poisons and would be unsuitable in commercial practice. The activity of the catalyst system under the test conditions, even when $GeO_2$ was added as activator, remained low, i.e. less than 13 g. of $NH_2OH$ per g. of palladium per hour, while further, the selectivity, i.e., the molar ratio between $HN_2OH$ formed and $NH_3$ formed was smaller than 10:1.

moderate—The activity of the catalyst solution was relatively low under the test conditions. Production of 13–20 g. of $NH_2OH$ per g. of palladium per hour was obtained, while the addition of $GeO_2$ as activator resulted only a small increase in activity. The solutions rated moderate would still be unsuitable in commercial practice.

good—The activity was relatively low under the test conditions. Production of 13–20 g. of $NH_2OH$ per g. of palladium per hour was obtained, addition of $GeO_2$ as activator led to a considerable increased activity, i.e. 20–25 g. of $NH_2OH$ per g. of palladium per hour.

very good—The activity, after addition of $GeO_2$, was maximum, i.e. more than 25 g. of hydroxylamine per g. of palladium per hour, while also, the selectivity was high, i.e., such that the molar ratio between $NH_2OH$ formed and $NH_3$ formed is greater than 10:1.

Three different samples of phosphoric acid, differing in origin, were used in the examples. The samples being indicated as acid A, B and C respectively.

The following table shows the contaminants contained in these samples in mg per liter of the 85 weight % $H_3PO$ solutions.

| Elements | Acid A | Acid B | Acid C |
|---|---|---|---|
| Cd | 3 | 1 | 1 |
| Pb | 7 | 3 | 2 |
| Cu | 1 | 0.5 | 0.5 |
| Sb | 1 | unknown | unknown |
| As | 0.5 | unknown | unknown |
| Al | 5 | unknown | unknown |
| Fe | 9 | 1 | 5 |
| Mo | 0.5 | unknown | unknown |
| Sn | 10 | 4 | 1 |
| Suitability | Moderate | Moderate | Good |

EXAMPLE 1

In 1 kg of each of the phosphoric acids A, B and C, 10 g. of 0.5 weight % Pd on active carbon (total of 50 mg of Pd) was suspended and hydrogen was passed through the suspension at a rate of 5 N liters per hour for 10 hours. The temperature was maintained at about 25°C. The palladium-carbon particles were then separated from the phosphoric acids and the resulting phosphoric acid solutions were tested for suitability in the catalytic reduction of nitric acid to hydroxylamine with molecular hydrogen. In all three cases, the suitability was found to have become 'very good' as a result of the treatment.

The amount of contaminants in the phosphoric acid solutions was drastically reduced by the treatment according to this invention. The data for acid A showed that after the treatment, the Pb content had decreased from 7 mg to 0.4 mg, the Cu content from 1 mg to less than 0.2 mg and Sn to less than 0.5 mg/l.

EXAMPLE 2

Demineralized water and sodium hydroxide were used to prepare a buffer solution of each of the non-purified acids A and C. These solutions contained 2.69 moles of $H_3PO_4$ and 2.1 moles of NaOH per liter. The suitability of these buffered phosphoric acid solutions in the catalytic syntheses of hydroxylamine ranged from moderate to good.

After these buffered phosphoric acid solutions were treated in accordance with the present invention by suspending 2.5 g. of 0.5 weight % palladium on carbon per 1 liter of the phosphoric acid and passing through hydrogen at 25°C for 10 hours, the suitability of the two buffered acid solutions in the catalytic synthesis of hydroxylamine was very good.

EXAMPLE 3

Hydrogen was passed through 1 kg of phosphoric acid A for 16 hours with 6 g. of palladium black being suspended in the phosphoric acid solution instead of palladium suspended on active carbon as in example 1.

The phosphoric acid after being separated from the palladium black was used in the catalytic synthesis of hydroxylamine and the suitability was very good.

EXAMPLE 4

To determine the approximate minimum quantity of the platinum group metal to be suspended in the acid solutions to be treated, samples of the buffered phosphoric acid A of example 2 were treated with hydrogen at 25°C for 16 hours with the buffered solutions containing various quantities of the platinum group metal. In the following table, the suitability of the treated buffered acid solutions in the hydroxylamine synthesis is given with the corresponding quantity of adsorbent (palladium 0.5 percent by weight) suspended in the buffered acid solution during the treatment thereof according to the invention.

| Quantity of paladium adsorbent in grams per kg of buffer solution | Suitability of acid solution in the Catalytic synthesis of hydroxylamine |
|---|---|
| 0 | moderate |
| 0.5 | moderate |
| 1.5 | good |
| 2 | very good |
| 2.5 | very good |

As can be seen from the above table, suspending as little as 1.5 grams of the palladium adsorbent (containing 0.5 percent palladium by weight) in the acid solution and bubbling hydrogen therethrough results in considerable increase in the suitability of the acid solution for further use in the catalytic synthesis of hydroxylamine.

EXAMPLE 5

The influence of duration of treatment of the solutions in example 4 was determined by treating 1 kg samples of phosphoric acid A with 10 g. of adsorbent (0.5 weight % Pd on carbon) at 25°C for various periods of time. The results are shown in the following table:

| Contact time in hours | Suitability of the treated acid solution in the catalytic synthesis of hydroxylamine |
|---|---|
| 0 | moderate |
| 1 | good |
| 5 | very good |
| 72 | very good |

As can be seen, as little as 1 hour duration of treatment resulted in greatly improved suitability of the acid solution for further use in the catalytic synthesis of hydroxylamine.

The degree of distribution of the metal from the platinum group on the carbon or other carrier mass also has an influence on the effectiveness of the process according to the present invention. If, for instance, when 5 weight % Pd on carbon was used as adsorbent, it was found possible to treat 1.5 kg of phosphoric acid A with 1 g. of adsorbent and obtain an improvement in the acid's suitability for further use in the catalytic synthesis of hydroxylamine to the qualification very good. However, if, instead of 1 g. of 5 weight % Pd on carbon, the palladium-equivalent quantity of 10 g. of 0.5 weight % Pd on carbon was used in the treatment, it was found possible to improve 2 kg of phosphoric acid A to the same level of suitability.

It was also found that the quantity of carrier material such as active carbon had no influence whatever on the effectiveness of the process according to the present invention. When the treatment was performed using 1 g of 5 weight percent palladium on carbon with an additional 9 g of active carbon, the result obtained was essentially the same as obtained without the additional 9 g. of active carbon.

EXAMPLE 6

To show the influence of an increase in temperature on the process of the present invention, 2 samples of phosphoric acid A of 1 kg each were contacted with hydrogen having 10 g of 0.5 weight % Pd on active carbon suspended therein, at temperatures of 60° C and 25 respectively. After a treatment of 1 hour, the suitability for further use in the catalytic synthesis of hydroxylamine of the phosphoric acid solution being treated at 60° C was very good. The phosphoric acid solution treated at 25° C required a 5 hour period to obtain the same increase in suitability.

In the process of the present invention, the treatment with hydrogen and a metal or combination of metals from the platinum group is essential. Treatment with platinum group metals such as Ru, Rh, Os, Ir and Pt, or a combination of said metals, in the presence of hydrogen leads to similar favorable results in relation to the suitability of phosphoric acid for the hydroxylamine synthesis as shown above when using palladium as shown in the following example.

EXAMPLE 7

Hydrogen was passed through a sample of phosphoric acid A containing an adsorption mass consisting of 1 weight percent platinum on active carbon, at 25°C for 16 hours. A quantity of 10 g. of adsorption mass per kg of 85 weight percent phosphoric acid was used.

After removing the adsorption mass from the phosphoric acid solution, it was found that the suitability of the phosphoric acid in the catalytic synthesis of hydroxylamine was very good. However, when silver on a carbon carrier was used instead of platinum on a carbon carrier, no improvement in quality of the phosphoric acid solution was obtained.

In the above examples, the treatment of the phosphoric acid was always effected in a reaction vessel provided with a stirrer, which was used to keep the adsorbent in suspension, as well as to divide the hydrogen into fine bubbles.

Of course, it is also possible to operate without mechanically stirring the solution and to keep the adsorbent suspended by the hydrogen stream. The acid can also be treated in a column with the acid or the solution to be purified and the hydrogen being contacted in either counter-current or in co-current fashion over a bed of the platinum group metal containing adsorbent. To avoid excessive resistance in such a column, the adsorbent should be present in the form of small lumps, granules, tablets, etc. The treatment may also be effected, continuously, in a reaction vessel provided with filter candles to retain the adsorbent.

If the adsorbent should appear to become inactive or insufficiently active due to adsorption of large amounts of the contaminants, it can be regenerated, for instance, by desorption with solvents that take up the contaminants. In the case of an adsorbent consisting of a platinum metal on carbon, the carbon will, preferably, be burned off, the remaining metal oxide be dissolved and, subsequently, this solution used for the preparation of new adsorbent.

What is claimed is:

1. In a process for producing a solution of hydroxylammonium phosphate comprising catalytically reducing nitrate ions in an aqueous solution and in the presence of molecular hydrogen and phosphoric acid,
   the improvement comprising removing heavy-metal contaminants from the phosphoric acid, prior to introduction into the hydroxylammonium phosphate production process, by (i) contacting the phosphoric acid containing heavy-metal contaminants with hydrogen and an adsorbent consisting essentially of a metal of the platinum group, thereby reducing the heavy metal contaminants and absorbing the heavy-metal contaminants on the adsorbent; and (ii) separating the absorbent from the thus purified phosphoric acid.

2. A process according to claim 1, in which the phosphoric acid is a partially neutralized solution.

3. A process according to claim 1, in which the phosphoric acid is contacted with the hydrogen and the adsorbent for at least 1 hour at a temperature of from about 25° C to 60° C.

4. A process according to claim 1, in which the adsorbent is palladium supported on activated carbon.

* * * * *